Nov. 4, 1941. H. D. HILL 2,261,497
METHOD OF PRODUCING COMB GRAIN VENEER
Filed Jan. 31, 1941  4 Sheets-Sheet 1
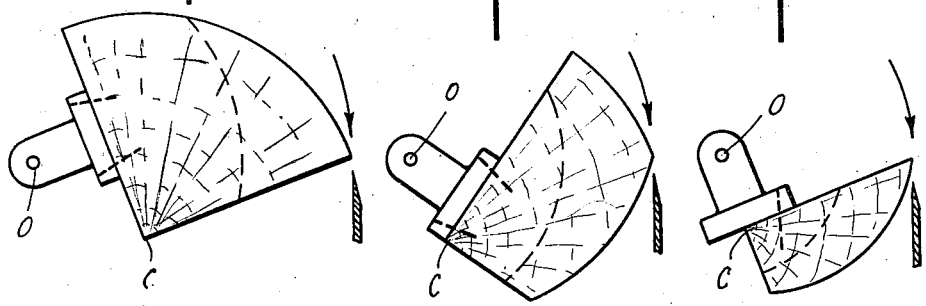
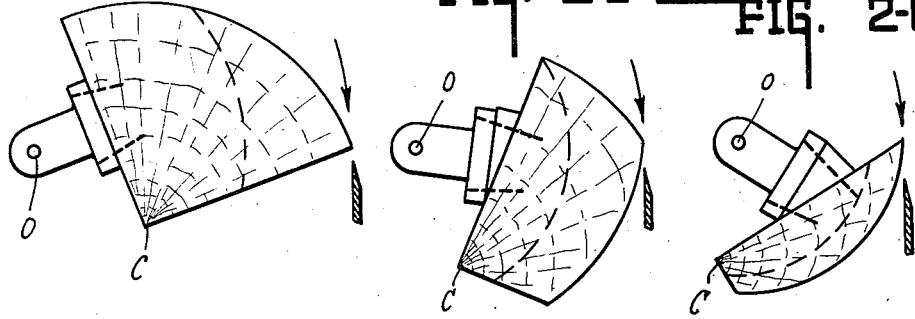
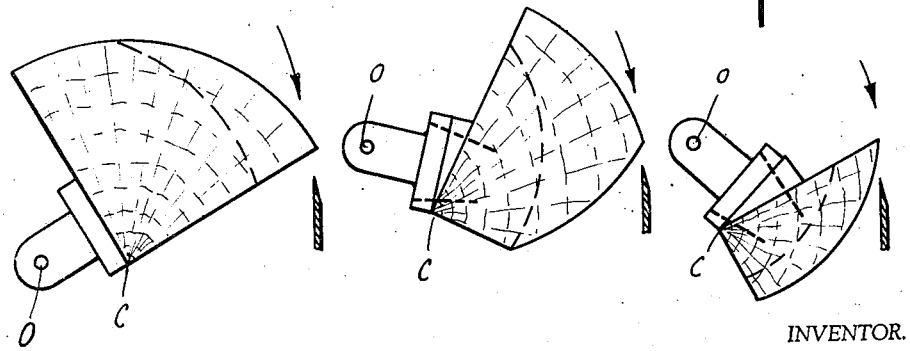
INVENTOR.
HARRY D. HILL.
BY Lockwood, Goldsmith & Galt
ATTORNEYS.

Nov. 4, 1941. H. D. HILL 2,261,497
METHOD OF PRODUCING COMB GRAIN VENEER
Filed Jan. 31, 1941 4 Sheets-Sheet 2
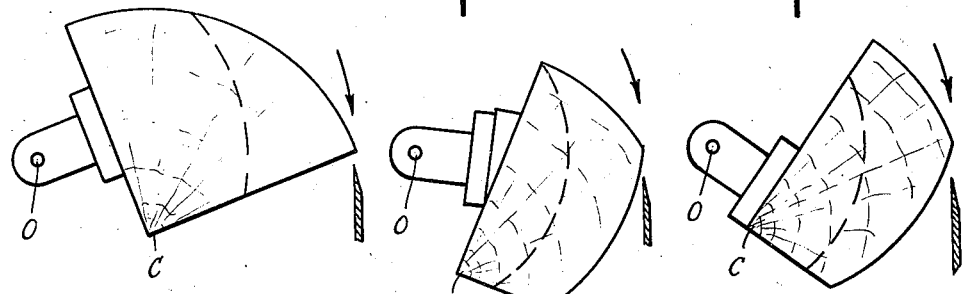
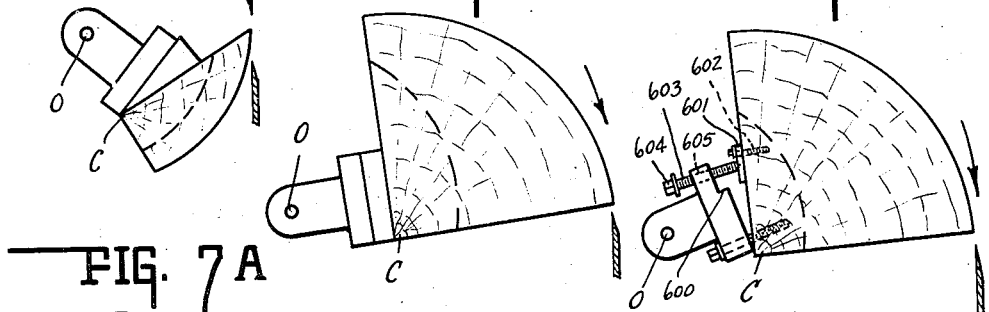
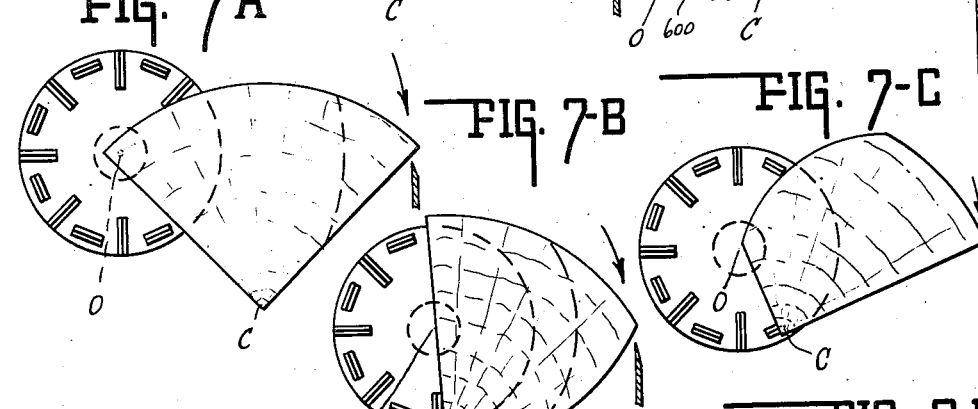
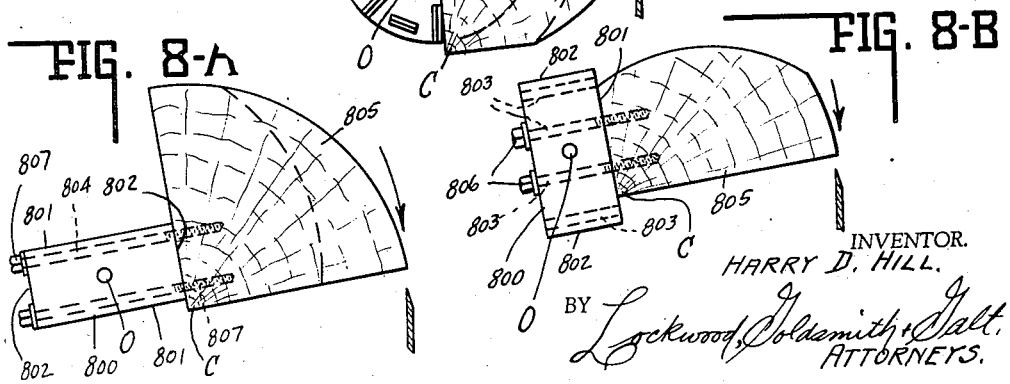
INVENTOR.
HARRY D. HILL.
BY Lockwood, Goldsmith & Galt
ATTORNEYS.

Nov. 4, 1941.  H. D. HILL  2,261,497
METHOD OF PRODUCING COMB GRAIN VENEER
Filed Jan. 31, 1941  4 Sheets-Sheet 3
FIG. 9-A
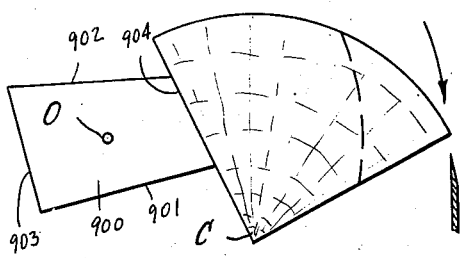
FIG. 9-B
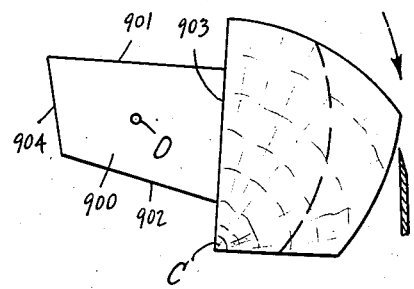
FIG. 9-C
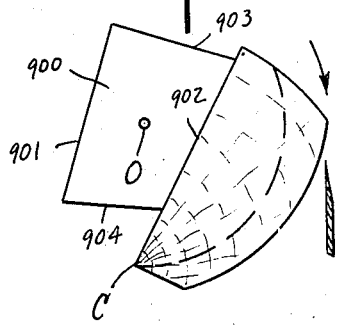
FIG. 9-D
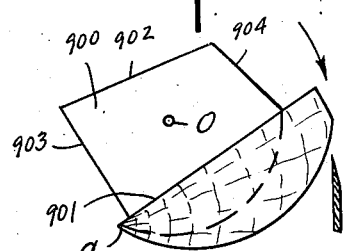
FIG. 10-A
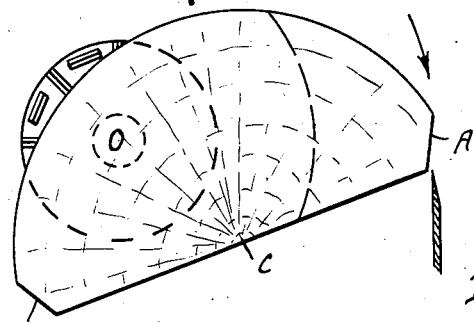
FIG. 10-B
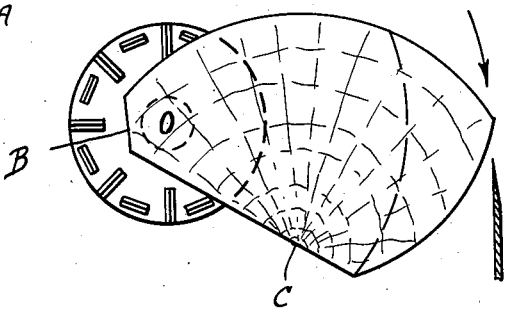
FIG. 10-C
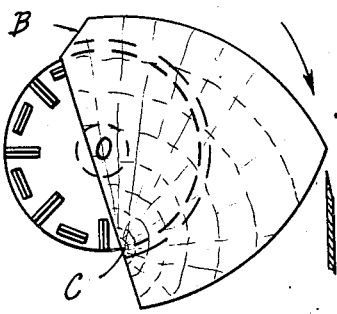
INVENTOR.
HARRY D. HILL.
BY Lockwood, Goldsmith & Galt,
ATTORNEYS.

Nov. 4, 1941. H. D. HILL 2,261,497
METHOD OF PRODUCING COMB GRAIN VENEER
Filed Jan. 31, 1941 4 Sheets-Sheet 4
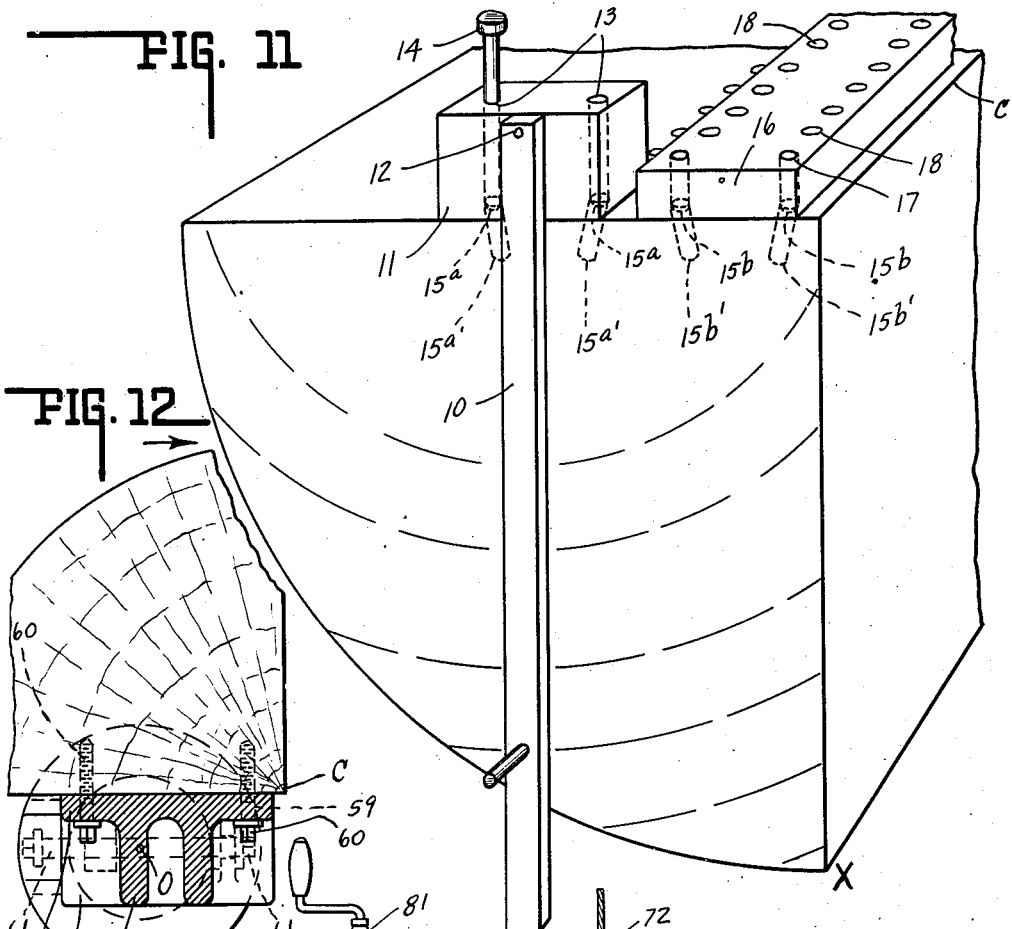
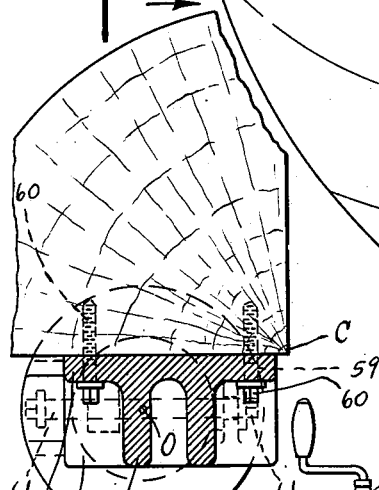
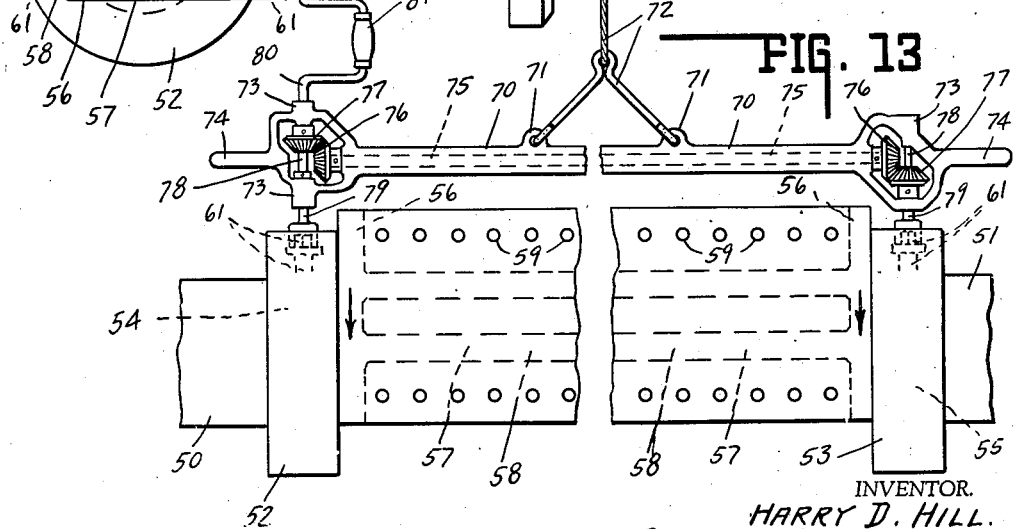
INVENTOR.
HARRY D. HILL.
BY Lockwood, Goldsmith & Galt,
ATTORNEYS.

Patented Nov. 4, 1941

2,261,497

UNITED STATES PATENT OFFICE 2,261,497

METHOD OF PRODUCING COMB GRAIN VENEER

Harry D. Hill, Franklin, Ind., assignor of fifty per cent to Amos-Thompson Corporation, Edinburg, Ind., a corporation, and fifty per cent to Hill Bros., Edinburg, Ind., a partnership composed of Harry D. Hill and Howard T. Hill Application January 31, 1941, Serial No. 376,722

2 Claims. (Cl. 144—309)

This invention relates to a process of producing what is called needle-point or comb grained veneer and, more particularly, oak veneer of this character. This veneer has been called bastard cut or rift cut.

Comb grain surface is one wherein pencil-like stripes predominate and substantially no large quartered flakes appear therein. Large quartered flakes in a surface produces a "quarter-sawed" or large figure pattern.

Quarter-sawed patterns several decades ago were most in demand, but at the present time there is but little demand for the same while the present demand in oak, at least, is for needle-point, comb grain, rift sawn, or bastard sawn or pencil stripe surfaces, these terms being synonymous.

This kind of veneer is now made on a slicing machine or is sawed on a segment saw. Most of this kind of veneer in the past has been sawed for the reason that when one sheet has been turned over to match another there would be no difference in color therebetween. Veneer that is sliced will show darker because knife made veneer pulls the grain of the wood. Certain woods, and oak is one of them, may be cut so that the veneer sheet will show stripes relatively straight and not much variation in stripe and color from edge to edge. This veneer may be "slip matched," that is, one piece laid beside the next without objectionable grain and color contrast therebetween. This, therefore, eliminates veneer turning for matching.

The present invention produces better "slip match" veneer and the veneer therefrom will be much more uniform from edge to edge than veneer made by slicing.

Veneer has been and now is made by slicing, or sawing. The latter is extremely wasteful of stock because each saw kerf destroys at least ½₀" of stock and sawing chafes the stock so that the veneer must be thicker than when sliced or cut to permit sanding, which is necessary to eradicate the chafe marks; hence, sawing per se is uneconomical.

Rift sawn veneer is made by quartering the log and each resulting quarter or flitch is sawn, the planes of the kerf cuts being across the flitch rays at an angle, this plane being approximately 22½° to one transverse face of the flitch and 62½° to the other transverse face thereof, all sawing planes being parallel.

Quarter-sawn or quarter-sliced veneer is where all parallel planes of sawing or slicing are at 45° to the two transverse faces of the quarter log flitches.

Plain sliced veneer is where the flitch is half a log and all slicing is parallel to the flat face of the flitch. Knife made veneer has no kerf waste and is economical to produce, but the surface varies because the relative angles between the rays and the plane of slice varies from parallelism to right angles, all appearing in the largest veneer sheet.

Slicing veneer requires a log support and a slicing knife, one being movable relative to the other and in a reciprocating manner, as is well understood in the art. After each slicing action (one reciprocation) the log or knife is indexed the thickness of the next slice.

Slicing is slower than the invention because of the size of flitches used in each method. Rift sawn flitches are applied to the slicer stay log and the sliced veneer is comb grained. However, to prepare these flitches for slicing results, as is well known in the industry, in unavoidable waste or loss of log stock. Also, the amount of veneer of this character so obtained is much less than that obtainable by practicing the present invention.

Cutting is practiced in two ways. Round cutting is where the whole log is centrally mounted and rotated against an advancing knife to form a sheet of veneer.

Two other well known cutting methods are known as half round and back cut. In each case, a similarly large lathe rotatably supports a stay log of metal and to the same is secured by screws the flitch in the form of a half log. When the flat side of the flitch is butt mounted on the stay log, half round cutting is obtained. When the curved or sap side of the flitch is fastened to the anchoring face of the stay log, back cutting is obtained. In each instance, a single veneer strip is formed in each rotation of the stay log and flitch.

The foregoing exceptionally brief summary of various methods of forming veneer has been given to emphasize the advantages of the present invention over the present and old standard practices of forming striped or comb grained veneer.

The present style veneer demands are now met by cutting a half log into several flitches, the sides of which are angular to the grain and then slicing these flitches. The veneer sheet is narrow and the formation of these flitches produces unavoidable waste. This has been previously referred to.

Another method has been to slice a quarter log flitch for about one-half of its volume, the remainder then being available only for quarter-sawn or sliced quarter veneer. This also produces waste in the initial formation of the flitch from the quarter log and, obviously, a low volume of comb-grained veneer.

From the foregoing, therefore, it is quite apparent that a cutting process involving no waste would be most efficient. It also is apparent that comb grain veneer never has been produced from the entire log or flitches formed therefrom without appreciable waste or formation of figured veneer or quarter-sawn lumber.

The present invention is directed to the process of cutting comb veneer without appreciable waste and utilizing substantially all the log for such veneer, with slight exceptions, such exceptions being the semi-elliptical sectioned core or backing portion of the flitch.

The chief object of this invention is to rapidly and economically produce comb grain veneer and, more particularly, of oak.

The chief feature of this invention is, first, to produce such veneer by a rapid process, and, secondly, by a process which utilizes all but a minimum portion of the log for that particular type of veneer.

The process briefly consists of breaking or sawing the log into flitches, the vertex of the flitch angle coinciding with the major heart center. Usually, the flitches are quarter logs but they may be thirds, fifths, or sixths, and in some instances they may be half logs.

Each flitch is mounted in a lathe and rotated. As it is rotated, a knife parallel to the axis of rotation cuts from the flitch a thin slice or sheet of veneer. The initial cut is always such that the knife cuts relative to the rays of the flitch so that comb grain only appears in the veneer. The cutting is always from the heart side toward the sap side so that proper veneer surface is obtained, reverse cutting opening surface pores and being objectionable.

As each flitch is rotated, the knife is progressively, although intermittently, advanced toward the axis of rotation an amount equal to the thickness of the veneer to be cut. Cutting is continued until figure begins to appear in the veneer. Then cutting is stopped and the relation of the flitch to the knife is changed so that comb grain effect will be obtained when cutting is resumed. This is continued until figure again begins to appear, whereupon the flitch-knife relationship is again adjusted and when adjusted, cutting is resumed. Cutting continues until it is no longer possible to cut veneer due to machine interference or flitch exhaustion, relationship adjustment being made as often as necessary.

Most veneer mills have lathes provided with stay logs or log chucks. Most lathes are arranged to support and rotate a stay log or to support and rotate opposed chucks, one being axially movable for clamping the log therebetween. The stay log may be of conventional or special character as hereinafter pointed out and may be adjustably supported by the lathe, such adjustment usually being provided to adjust the flitch supporting face of the stay log relative to the axis of stay log rotation, although herein the supporting face portion may be so supported that it may be adjusted angularly for the purposes of the present invention.

When flitches are about 6 ft. in length, they may be readily utilized in a "chuck" lathe. If longer, "whipping" occurs as the flitch is reduced so that if two lathes were available, the first and sometimes the second cut could be made upon the chuck lathe and then the second and third, or third and fourth cuts, respectively, could be made upon the stay log lathe. When longer flitches are to be cut, they are usually cut upon a stay log lathe. By the aforesaid, it is not to be understood that each lathe is different for in many instances, the lathe includes readily interchangeable chucks and stay log.

The process briefly consists in mounting a heart center split or sawed flitch upon a lathe for rotation to intermittently and successively present to a knife (parallel to the axis of rotation) the heart side of the flitch at such an angle that comb grain veneer is cut from the flitch, the heart center being eccentric or offset from the axis of flitch rotation, cutting continuing until figure begins to appear, whereupon the flitch is shifted relative to the knife for continued cutting of comb grain veneer and resuming cutting, shifting occurring as often as necessary and in the most expeditious manner, as pointed out hereinafter.

Quarter log flitches have been found most convenient to produce and utilize but by referring thereto herein, other heart center flitches are not to be excluded from this invention.

The full nature of the invention will be understood from the accompanying drawings and the following description and claims:

In the drawings, Fig. 1A is a diagrammatic side elevation of a stay log and quarter log flitch with veneer knife adjacent thereto, the flitch being approximately medianly mounted on the stay log.

Fig. 1B is a similar view with the flitch mounted on the stay log so that the cutting face is substantially coincident with the knife approaching side edge of the stay log.

Fig. 1C is a similar view with the reduced flitch similarly shifted as before to permit further reduction of the flitch and veneer formation therefrom, but in this instance the flitch is secured to the stay log by a single row of screw bolts.

Figs. 1A to 1C, inclusive, are diagrammatic representations of the shifting of the flitch on the stay log and parallel to the flitch anchoring face thereof.

Fig. 2A is a view similar to Fig. 1A.

Fig. 2B is a view similar to Fig. 2A but with the reduced flitch tilted on the stay log by means of a wedge arrangement.

Fig. 2C is a similar view of the reduced flitch tilted to a greater degree by the inclusion of a thicker wedge.

Figs. 2A to 2C, inclusive, are diagrammatic representations of the tilting of the flitch upon a stay log, the flitch being medianly secured, as it were, to the stay log.

Fig. 3A is a diagrammatic view of a small log flitch secured to a stay log with the knife approaching face of the stay log in substantial registration with the initial cutting face of the flitch.

Fig. 3B is a similar view of the reduced flitch tilted upon the stay log by means of a wedge.

Fig. 3C is a similar view of the still further reduced flitch tilted to a greater degree by means of a still thicker wedge.

Figs. 3A to 3C, inclusive, differ from Fig. 2A to Fig. 2C, inclusive, in that the flitch is initially positioned on the stay log in a different position, tilting by wedging being disregarded in this comparison.

Fig. 4A is a view similar to Fig. 1A.
Fig. 4B is a view similar to Fig. 2B.
Fig. 4C is a view somewhat similar to Fig. 1B.
Fig. 4D is a view similar to Fig. 3C.

Figs. 4A to 4D, inclusive, are diagrammatic views of flitch mounting including progressive shifting and tilting, the latter being by wedging.

Fig. 5 is a diagrammatic representation of a flitch mounted on a stay log in juxtaposition to a veneer knife and with an included spacing member between the stay log and the flitch, to leave a smaller core.

Fig. 6 is a diagrammatic view of a representation of a flitch, a veneer cutting knife and a stay log supporting the flitch, the flitch being secured to the stay log by means of an adjustable screw arrangement whereby the flitch may be progressively tilted on the stay log.

Fig. 7A is a diagrammatic view of a veneer lathe chuck plate, veneer knife and a flitch carried by the chuck plate.

It is noted that the flitch is so supported by the chuck plate that the heart center is eccentric or offset from the axis of rotation of the chuck plate and in this respect is the same as all the preceding figures wherein the heart center of the flitch is eccentric of the axis of rotation of the stay log.

Fig. 7B is the diagrammatic representation of the flitch shown in Fig. 7A when reduced and in a shifted position for a second cutting operation.

Fig. 7C is a similar view of the flitch shown in Fig. 7B when reduced still further and shifted still further.

Fig. 8A is a diagrammatic view of a flitch mounted on a modified form of stay log.

Fig. 8B is a similar view of the same stay log with the reduced flitch, otherwise mounted on said stay log.

Fig. 9A is a diagrammatic view of a still further modified form of stay log with the flitch mounted thereon.

Fig. 9B is a similar view of the flitch shown in Fig. 9A when reduced and mounted upon the opposite side of the stay log shown in Fig. 9A.

Fig. 9C is a similar view with the flitch shown in Fig. 9B further reduced and mounted on an intermediate side of the stay log.

Fig. 9D is a similar view of the smallest flitch reduction mounted on the other intermediate side of the stay log.

Figs. 8A—8B are representative of a shifting of the flitch to different sides of the stay log to obtain shifting of the flitch on the stay log relative to the axis of rotation of the stay log.

Figs. 9A to 9D, inclusive, are of similar character.

Fig. 10A is a diagrammatic representation of a lathe type chuck, the veneer knife in juxtaposition thereto and half round flitch mounted thereon.

Figs. 10B and 10C are similar views of the flitch shown in Fig. 10A when reduced and supported in progressive tilted positions with reference to the position shown in Fig. 10A for the subsequent cutting of veneer.

It will be noted that in Figs. 10A to 10C the heart center of the flitch is always eccentric of the axis of rotation. It will be noted this condition applies to each and every figure before mentioned and it also will be noted that the cutting always occurs from the heart side and is directed toward the sap side of the flitch.

Fig. 11 is a diagrammatic section of a quarter log flitch with a scribing gauge, chalk and punch for marking purposes, and a pattern board for bolt position marking applied to the flitch.

Fig. 12 is a transverse sectional view through a modified form of stay log mounting with a quarter log flitch thereon illustrative of another method of forming comb veneer. The flitch is ready for initial cutting and the stay log proper is brought toward the axis of rotation as the flitch is reduced.

Fig. 13 is a side elevational view of the adjustable stay log arrangement shown in Fig. 12.

Inasmuch as most veneer mills have veneer lathes for half round cutting and back cutting and the same is provided with a stay log, most of the diagrams are intentionally directed to the utilization of such standard equipment. When, however, the lathe is equipped with chucks, the invention still can be practiced therewith. If desired, the lathe may be provided with special stay logs and in that event, the invention also may be practiced. Such special stay logs are illustrated in Figs. 8A and 8B and Figs. 9A to 9D, inclusive, and a conventional stay log may be provided with an additional screw arrangement, such as shown in Fig. 6. Herein by way of example only, most of the flitches are shown as quarter logs. The reason for that is it is easier to split or saw a log in half and then to split or saw the half logs into quarter logs. The flitches so formed are preferably formed by sawing, since smooth working and anchoring faces are formed thereby.

In forming the flitches, the greatest care is exercised to have the vertex of the flitch angle substantially or exactly, if possible, coincident with the heart center of the log. If it is not substantially or exactly coincident therewith, the vertex will be eccentric of the heart center and, therefore, the figure will appear in the cutting of the veneer more quickly than it would if the flitch had its vertex coincident with the heart center. It, therefore, will be recognized that the quarter fliches are not necessarily equal pieces because the heart center may not be the geometric center of the log if the log not be relatively round.

As is common in veneer practice, following flitch formation, the flitches are soaked and heated, great care being taken to avoid underheating and overheating and undersoaking and oversoaking. The reasons for the same are well known in the veneer industry and but one reference is made thereto, to-wit, excessive over or under heating will "pop" the cell structure so that in the cutting of veneer, the veneer face is not a satisfactory surface. The flitches after being properly soaked and heated are removed, one at a time, from the soaking and heating pit and the bark, surface knots and the like, are removed therefrom. The entire surface is scraped. The purpose of this scraping is to remove grit, sand and particles and expose any other obstacles that might injure the veneer knife. Following such scraping, which is a cleaning step, the flitch, when it is to be mounted on the stay log, is prepared as shown in Fig. 11.

When it is to be mounted between the chucks, the flitch is elevated by chain and hoist and properly positioned between the chucks, as shown in Fig. 7A. Thereupon the axially movable chuck is caused to advance toward the relatively stationary chuck and the teeth of the chuck are caused to engage the ends of the log. The knife then is advanced while the flitch is slowly rotated and the heart side or initial cutting face is presented to the knife and a strip of veneer is cut therefrom.

These strips progressively increase in width and cutting continues, the knife advancing the thickness of the veneer strip following each slice removal until figure begins to appear, then the rotation of the flitch is stopped. The knife is backed off, the hoist arrangement again is associated with the flitch and carries the load thereof. The axially movable chuck then is caused to move away from the relatively stationary chuck, thereby freeing the flitch from the chucks. The flitch then is repositioned as required as shown in Fig. 7B and rechucked, following which the hoist is removed and cutting is resumed. Usually the adjusted position is determined by having the flitch bear against the knife with the advancing face of the flitch at the proper angle to the knife so that comb grain veneer will be cut from the flitch and cutting continues until figure appears. Any number of shiftings of the flitch relative to the axis of rotation and with relation to the knife may be effected as desired or required. It will be understood that these adjustments of the flitch in the rotatable support are made so as to present that surface of the flitch to be engaged by the knife so that the rays of the flitch will be disposed at an acute angle to the knife.

In like manner—see Figs. 10A and 10B—a half round flitch may be chucked and progressively shifted in order to effect comb grain veneer production from substantially the entire flitch except for the core.

It is to be observed that when the flitch is materially reduced in area that by reason of the end clamping action of the chuck members, the flitch has a tendency to vibrate or chatter and consequently, if a veneer manufacturer has two lathes in operation, it would be highly advantageous to initially cut comb grain veneer on the chuck lathe and then apply the reduced flitch to the stay log lathe and finish cutting of the flitch on the stay log lathe, the stay log in this instance reenforcing the flitch and by reason of the stay log the flitch does not vibrate in that cutting. When, of course, the flitch does not vibrate in the chuck type lathe, the cutting may continue until substantially all veneer is cut therefrom. This leaves a very small core. This vibration is very pronounced when the logs exceed 6 ft. in length, whereas in logs of 6 ft. or shorter, the vibration is very slight so that 6 ft. logs may be cut for the production of comb grain veneer substantially to the core and without transference to a stay log lathe or inclusion of some reenforcement or backing to prevent "whipping" of the flitches in the cutting.

Another variation of the aforesaid is to make two cuts substantially as shown in Figs. 10A and 10B and then turn the flitch end for end and use the opposite small face indicated at B as the face indicated at A has been previously used in Figs. 10A and 10B. This shift may be made after the first chucking or the second chucking or the third chucking, as desired or required. Figs. 10A, 10B and 10C represent a 20 inch half log flitch which was reduced to core size by but three chucking operations and no end for end turning or inversion was required. It all depends on how the grain appears, type of wood, size of log, et cetera, whether the same should be turned end for end.

In Figs. 10A, 10B and 10C the heart center is marked C and the chuck center or axis of rotation is marked O. It will be noted that each change of flitch position results in the chuck center or axis of rotation O and the heart center C always being positioned closer together than in the previous chucking.

If the veneer manufacturer has two chuck lathes and no stay log lathe, an 8 x 8 timber may be used in lieu of a stay log and the reduced flitch may be bolted to the 8 x 8 timber in the manner in which it would normally be bolted to a stay log and then the ends of the timber would be clamped in the chuck and cutting continued until there was danger of the ends of the bolts engaging the knife, whereupon cutting would cease, the core would be removed from the timber and discarded and the timber would be available for the application of a second reduced flitch.

All that has been set forth with respect to chuck lathe production of comb grain veneer with reference to quarter log flitches, it is obvious is equally applicable to the production of comb grain veneer from a half log flitch, it being quite apparent, however, the number of shiftings of the flitch in the chuck would approximately be doubled.

It, of course, is understood it is relatively easy with power operable chucks and with an overhead hoist arrangement to quickly apply the hoist, release the chucks, reposition the flitch, reapply the chucks and then release the hoist. Such an operation requires but a few minutes between the time cutting is stopped for one flitch setting in the chuck and cutting is started at the successive setting in the chuck.

No further reference will be had to Figs. 7A to 7C, inclusive, and Figs. 10A to 10C, inclusive.

Reference now will be had to Fig. 11 more particularly. The cleaned and properly heated quarter log flitch is suitably supported and then a master gauge is applied to the sawed end of the flitch as shown in Fig. 11, if desired or necessary. Chalk marks are placed on that end by swinging the arm 10 and comparing the same with the flitch radiating rays, as shown in Fig. 11.

The base 11 of the gauge pivotally supports the arm 10 at 12 and this base is shifted to and fro until by trial and observation the proper position is obtained. The base 11 has holes 13 therethrough spaced apart the exact distance that the stay log bolt receiving holes are spaced apart on the flitch mounting face of the stay log. The distance that the pivot 12 is from the face upon which the block 11 bears is the distance that the flitch mounting face of the stay log is offcenter from the axis of rotation of the stay log and this is necessary to determine the exact position that the flitch should be secured to the stay log in order to determine the correct radius to obtain comb grain veneer when starting the cutting process upon the flitch when mounted on the stay log.

A punch 14 marks these hole locations at 15a. Then the gauge is moved toward the heart center edge of the flitch and additional marks 15b are formed in the flitch. These latter marks are so placed that the stay log anchoring screws always will enter the flitch and hold the same to the stay log.

Then a master board 16 is twice applied to the punch marked face of the flitch and holes 17 of the board are registered with holes 15a and then with holes 15b, the board being spaced from the log center edge at the opposite end of the flitch the exact distance it is spaced from the log center edge of the flitch at the arc scribed end or face thereof.

The board may have two series of holes 18, each aligned with a hole 17. The punch 14 marks the flitch through all of one series and therein that closest to the unmarked face of the flitch and, in most cases, only the two end holes closest to the ends of the flitch, it being found unnecessary, usually, to use more than two end screws of the other available series and these are to prevent chattering, etc. Following hole marking, holes usually are drilled into the flitch to the proper depth and preferably with a power drill to expedite production.

When the preceding flitch has been completely cut, the core thereof is removed from the stay log by backing out the anchoring screws. The knife is moved away from the stay log rotation axis and to a position where it will not cut the new flitch, if accidentally rotated past the same.

Then the marked and hole drilled flitch is presented to the anchoring face of the stay log and is positioned so that its anchoring face is opposite the knife relative to the axis of stay log rotation. The hoist, cable and grips present the flitch to the face of the stay log and hold the flitch until the screws are reapplied to the stay log which is when the flitch drilled holes 15a′ and 15a′ register with the stay log holes. The bolts in the two end holes are usually applied after the flitch has been rotated 90°. A power tool, preferably, is used for screw application and removal to facilitate flitch mounting and removal.

After mounting and securing the flitch to the stay log so same will not chatter in cutting, the flitch is slowly rotated and the knife brought back into cutting position and cutting started at slow speed. When the veneer sheet so cut is of commercial width and length (because the tree may not have been of uniform diameter) normal cutting speed is utilized.

Cutting then is continued until figure begins to appear in the veneer. When that occurs the rotation is stopped, the hoist, cable and grips are reapplied to the flitch ends and then the screws are removed. The flitch then is shifted on the face of the stay log and similarly re-anchored thereto as at 15b′. Cutting is resumed until only the core is left on the stay log. When this occurs, it is removed and a new flitch is applied, said new flitch having been prepared as previously described while the preceding flitch was being cut.

If two positionings of the flitch upon the stay log as represented by Figs. 1A and 1B are insufficient to reduce the flitch to core size, the same procedure previously set forth is repeated and the flitch is shifted from the position shown in Fig. 1B to the position shown in Fig. 1C and since the flitch is of considerably less weight and volume, a single row of bolts, as shown by the dotted lines in Fig. 1C, is sufficient to anchor this reduced flitch to the stay log. The reason chattering does not occur with this reduced flitch is because a stiff and rigid support is provided for the reduced flitch, the latter being secured to the stay log substantially coincident with the length thereof.

As shown in Fig. 11 the stay log positions on the flitch are determined by trial and error. Gauge operators become so skillful that little or no shifting of base 11 is required. The initial cut begins at X and proceeds toward the heart center C until figure begins to appear in the veneer. Thereupon, the flitch is shifted on the stay log and cutting again resumed as before. The foregoing, due to the throw of the cheek distance, insures proper cutting of the reduced flitch and permits proper cutting thereof to core size.

As stated, cutting at an angle to the rays produces comb grain or stripe effect so that by the aforesaid method of shifting the flitch relative to the knife all of the flitch but the flitch core can be utilized for comb grain veneer.

Reference now will be had to Figs. 2A to 2C, inclusive. Herein Fig. 2A illustrates the quarter log flitch. Approximately medianly mounted on the stay log and as determined by the gauge in Fig. 11 and more particularly the holes 15a′, is the quarter log flitch. The holes 15b′ are not utilized in this form of the invention.

When the first cutting step has been practiced until figure begins to appear, the receding end bolts are removed and the advanced stay log bolts are slightly loosened and then a wedge as shown in Fig. 2B is interposed between the flitch and the flitch mounting face of the stay log. The anchoring bolts then are applied and pass through this wedge or if the wedge arrangement be slightly shorter than the distance between the two end bolts, the bolts clear the wedge but do enter the flitch. This cocks or tilts the flitch on the stay log. Then the advanced row of bolts are retightened which rigidly anchors the flitch to the stay log, and cutting is resumed. If necessary, as shown in Fig. 2C the process may be repeated, substituting a thicker wedge for the wedge illustrated in Fig. 2B and cutting resumed until nothing but the core remains, which is discarded.

Reference now will be had to Figs. 3A to 3C, inclusive. In these figures, it will be noted the only difference is that the flitch is mounted on the stay log utilizing only the openings formed in the flitch and designated by the numeral 15b′ in Fig. 11. Progressive wedging as illustrated in Figs. 3B and 3C is utilized. Thus the process diagrammatically illustrated in Figs. 2A to 2C, inclusive, is similar to the process diagrammatically illustrated in Figs. 3A to 3C, inclusive.

In Figs. 4A to 4D, there is diagrammatically illustrated a process which is a combination of the aforesaid processes and Fig. 1A shows the flitch rigidly mounted approximately medianly on the stay log similar to Figs. 1A and 2A. When figure begins to appear, the flitch is tilted, as shown more particularly in Fig. 2B, and is illustrated herein in Fig. 4B. When figure again begins to appear, the flitch is shifted on the stay log, compare Fig. 1A with Fig. 1B, and cutting is resumed. Then when figure again begins to appear, the reduced flitch again is tilted on the stay log by wedging action as illustrated in Fig. 4D which is similar to Fig. 3C.

These various embodiments of the process are herein set forth so that the industry may readily practice the invention because variations in different woods and variations in the same wood but different flitches may necessitate the practicing of one or the other of the aforesaid embodiments, all of which have in common mounting the flitch on the stay log and then shifting the flitch position relative to the stay log, either by shifting the flitch bodily thereon or by tilting the flitch relative to the anchoring face of the stay log or by both forms of shifting.

Reference now will be to Fig. 5. In this figure there is illustrated a quarter log flitch mounted on the stay log in much the same manner as the quarter log flitch is mounted on the stay log shown in Fig. 3A but with this exception. There is herein interposed a spacing member or plank to space the flitch from the face of the stay log to obtain more veneer and a smaller core.

Reference now will be had to Fig. 6. In this figure there is illustrated a stay log and a flitch. The receding end bolts herein are replaced by an adjustable screw construction. The stay log may be recessed as at 600 and nest therein a plate 601, the latter being suitably secured as at 602 to the flitch. The plate rotatably supports one end of a screw 603, the free end thereof 604 being squared, or the like, for wrench engagement and herein the opening 605 through the stay log is threaded and the body portion of the member 603 is similarly threaded. In this form of the invention the flitch is initially mounted so that the plate 601 is nested in the aperture 600 and the advanced series of screws rigidly hold or secure the flitch to the stay log. Cutting is initiated and continued until figure appears. Then the advanced series of screws are loosened, the members 603 are turned to advance the screws in the stay log. This results in tilting or tipping the flitch in the advanced direction in much the same manner the addition of the wedges previously described tilts the stay log. The advanced series of screws then are retightened and cutting resumed until figure again begins to appear. The advanced series of screws are again loosened, the adjusting screws 603 are advanced to secure further tilting of the flitch on the stay log, and then the advanced series of screws are retightened and cutting resumed. This operation may be repeated as often as desired or required, it being, of course, understood that cutting is always continued until figure begins to appear.

Reference now will be had to Figs. 8A and 8B. In this form of the invention the stay log is indicated by the numeral 800 and it includes one wide flitch supporting face 801 and the narrower flitch supporting face 802. It also includes spaced openings therethrough as indicated at 803 and 804. The flitch 805 of quarter log character is, first, applied to the narrower face of the stay log and secured by the longer screws 807, the same extending through the openings 804. When figure appears, the flitch is removed from the stay log and reapplied thereto on the wide face 801, as shown, and secured to that face by the shorter screws 806 in openings 803 and cutting is resumed.

It will be observed that the effect of this shifting of the flitch on the stay log is to move the reduced flitch closer to the center of rotation and this is emphasized because it is important with reference to the form of the invention shown in Figs. 12 and 13. Herein heart center C in Fig. 8B is closer to the axis of rotation O than in Fig. 8A.

Reference now will be had to Figs. 9A to 9D, inclusive. In this form of the invention the stay log 900 is of irregular outline and includes the widest face 901, the second widest face 902, a narrower face 903 and the narrowest face 904. The flitch is successively secured to these faces, as illustrated in the four figures, and cutting is effected in each case until figure appears, whereupon the flitch is removed and transferred to the next widest face and cutting is resumed. The flitch on the widest face is cut until figure appears. Then the core is discarded. In each case the flitch heart center is brought closer to the center of rotation.

Reference now will be had to Figs. 12 and 13, in which the numeral 50 indicates one rotatable element and 51 an opposed element, the same being carried by the lathe proper and the two being in alignment and power rotatable. Each terminates in a confronting plate arrangement 52 and 53, respectively, and said confronting plate arrangement is provided with a slide, slidably supporting a cross head, the two cross heads being designated by the numerals 54 and 55.

Rigid with each cross head is the flange 56 at the adjacent end of the stay log having the main body portion 57 and the flitch supporting face portion 58, the latter being wider than the portion 57 and being apertured as at 59 to permit the passage of screw 60 for anchoring the flitch to the stay log. A threaded arrangement indicated generally by the numeral 61, is provided between each cross head and its slide support, and associated with the exposed portions thereof is an overhead wrench structure.

Herein said wrench structure includes an elongated frame-like member 70 which is tubular and includes apertured ears 71 for connection to a cable or chain arrangement 72 for support overhead. The tubular portion 70 includes two parallel tubular extensions at right angles to the portion 70 and indicated by the numeral 73. Handles 74 may be provided and extend beyond the portion 70.

Mounted in the tubular portion 70 is a shaft 75 and the opposite ends mount bevel gears 76. The same mesh with bevel gears 77 carried by shafts 78 that extend through the tubular portion 73 and terminate in complementary portions 79 adapted to be detachably associated with the exposed portions 61 of the screw arrangements. One of the shafts 78 is extended as at 80 and a brace structure 81 is adapted to rotate that shaft 78 which in turn rotates the shaft 75 in turn rotating the other shaft 78. These two shafts 78, when the entire wrench arrangement is lowered and held down by the handle 74 in contact with the exposed portions of the members 61 cause rotation of the members 61 to advance or retract the cross heads in the slideways and simultaneously and to the same degree depending upon the direction of rotation of the brace 81. Thus, insofar as the center of rotation of the members 50 and 51 are concerned or the axis of rotation of the stay log structure, the stay log structure proper may be advanced from or retracted toward the center of rotation, as before mentioned.

As shown in Fig. 12, the flitch is secured on the stay log, as illustrated in Fig. 3. The stay log is projected forwardly as far as possible or desirable relative to the knife so that initial cutting produces comb grain veneer. As cutting proceeds and figure begins to appear, stay log and flitch rotation is stopped. Then the wrench is associated with the stay log adjusting arrangement and the stay log is retracted from the knife and stay log adjustment is made. Then cutting is resumed. This is repeated as often as required until finally only the core remains on the stay log. This is the equivalent of shifting the flitch on the stay log for positioning closer to the center of rotation and also it will be apparent is substantially the equivalent of tilting the flitch on the stay log for like purposes.

As previously set forth, since most veneer mills have lathes of conventional stay log and/or chuck character, as described herein, the invention has been disclosed herein with reference thereto because little or no additional plant investment is required to practice this invention. Additional plant investment would be required to supply the stay logs as shown in Figs. 8A and 8B, Figs. 9A to 9D and Figs. 12 and 13. The form of the invention disclosed in Figs. 12 and 13, it is believed will be the ultimate commercial adaptation of the industry because of its flexibility and ease of adjustment and range of possible adjustment.

The invention accordingly is not limited to the former or the latter but includes all the specific methods disclosed, same being variations of the basic invention.

So far as known, cutting on a lathe of comb grain veneer never before has been discovered or practiced for as stated, this veneer, heretofore, always has been produced by sawing or slicing.

In explanation of the term employed in the claims "until figure begins to appear" it is pointed out that each time the flitch is rotated past the veneer knife it cuts from the flitch a sheet of material of the desired thickness and of a width depending upon the position of that cut with reference to the flitch, etc. and of length equal to that of the flitch.

The several sheets of veneer so formed, one for each rotation of the flitch, will have the desired comb grain surface. Cutting continues until the relationship of the knife to flitch is such that a variegated pattern effect, not a pencil stripe effect would appear in the next sheet of veneer if the cutting operation were continued. Quarter sawed oak has a surface in which "figure," as used in the veneer industry, predominates.

When it appears from an examination of the veneer sheets as formed, that figure will appear, cutting is discontinued, and the flitch is shifted as described so that the next cutting will produce comb grain veneer in the next sheet cut from that flitch.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. The method of cutting comb grain veneer, consisting in forming a log into a plurality of segmental flitches having the center of the log heart coincident with the flitch vertex, mounting the flitch upon rotary supporting means with the flitch vertex parallel with but eccentric to the axis of rotation of said supporting means, rotating said supporting means so as to bring a side of said flitch successively into cutting contact with a knife at an acute angle to the rays of the flitch until just prior to the appearance of figure in the veneer, and then changing the position of the flitch on its rotary supporting means meanwhile maintaining said flitch eccentric to the supporting means to maintain said angle of cut.

2. The method of cutting comb grain veneer, consisting in forming a log into a plurality of segmental flitches having the center of the log heart coincident with the flitch vertex, mounting the flitch upon rotary supporting means with the flitch vertex parallel with but eccentric to the axis of rotation of said supporting means, arranging a knife for successive movements toward the axis of said supporting means, adjusting the flitch upon said supporting means so as to bring the flitch successively into cutting contact with the knife at an acute angle to the rays of the flitch until just prior to the appearance of figure in the veneer, and then changing the position of the flitch upon its rotary supporting means by moving the vertex relative to the axis of said supporting means but maintaining its parallelism therewith to maintain said angle of cut.

HARRY D. HILL.